United States Patent
Li et al.

(10) Patent No.: US 12,228,685 B2
(45) Date of Patent: Feb. 18, 2025

(54) VARIABLE WETTABILITY SENSOR DEVICE COVER

(71) Applicant: GM GLOBAL TECHNOLOGY OPERATIONS LLC, Detroit, MI (US)

(72) Inventors: Zhe Li, Rochester, MI (US); Bo Yang, Rochester Hills, MI (US); Yuchuan Liu, Troy, MI (US); Julien P. Mourou, Bloomfield Hills, MI (US); Rachit Garg, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 446 days.

(21) Appl. No.: 17/741,740

(22) Filed: May 11, 2022

(65) Prior Publication Data

US 2023/0366996 A1    Nov. 16, 2023

(51) Int. Cl.
| | |
|---|---|
| *G01S 7/497* | (2006.01) |
| *G01D 11/24* | (2006.01) |
| *G01S 7/02* | (2006.01) |
| G01S 13/931 | (2020.01) |
| G01S 17/931 | (2020.01) |

(52) U.S. Cl.
CPC ............ *G01S 7/497* (2013.01); *G01D 11/245* (2013.01); *G01S 7/027* (2021.05); *G01S 2007/4977* (2013.01); *G01S 13/931* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 10,111,606 | B2* | 10/2018 | Davis | A61B 5/082 |
| 11,519,840 | B2* | 12/2022 | Herman | G01N 13/02 |
| 2006/0040164 | A1* | 2/2006 | Vyas | H01M 8/04156 |
| | | | | 429/535 |
| 2018/0178248 | A1* | 6/2018 | Rajagopalan | B29C 59/16 |
| 2020/0025978 | A1* | 1/2020 | Ashtiani | G03B 17/56 |
| 2021/0247310 | A1* | 8/2021 | Chu | G01N 1/28 |

* cited by examiner

*Primary Examiner* — Daniel S Larkin
(74) *Attorney, Agent, or Firm* — CANTOR COLBURN LLP

(57) ABSTRACT

An apparatus for protecting a sensor device includes a cover mounted on the sensor device, the cover including a cover portion made from a transparent material that is transparent to sensor signals, the cover portion including an external surface having a wettability that varies according to a wettability gradient in a selected direction along the surface.

20 Claims, 7 Drawing Sheets

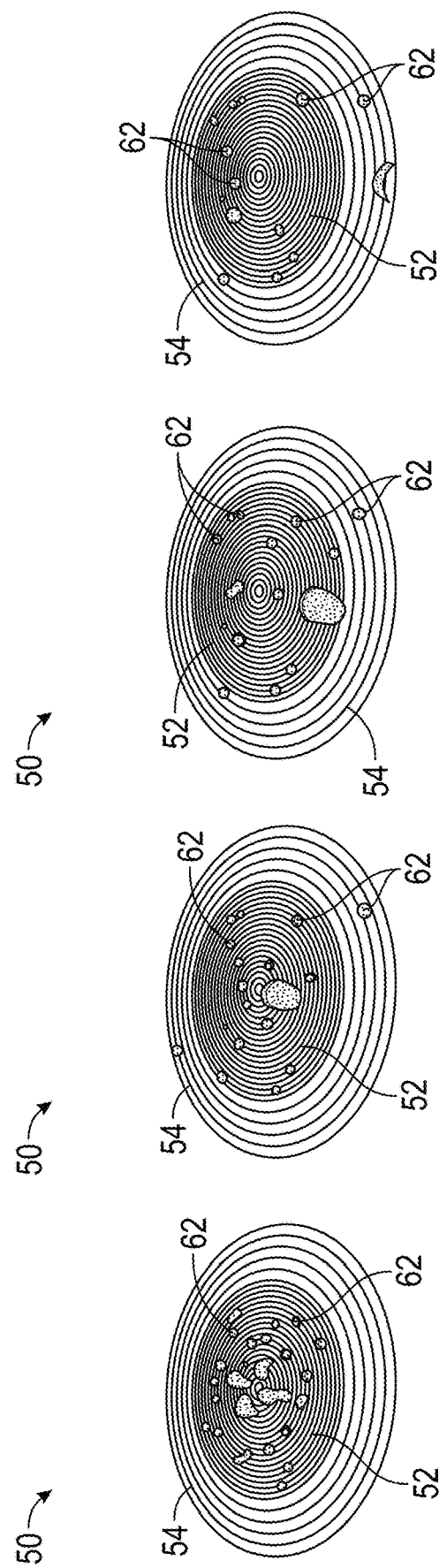

VARIABLE WETTABILITY SENSOR DEVICE COVER

INTRODUCTION

The subject disclosure relates to protective devices and apparatuses.

Vehicles (e.g., automobiles, trucks, aircraft, construction equipment, farm equipment, automated factory equipment) are increasingly equipped with sensor systems for monitoring surrounding environments. Optical camera, radar and/or lidar systems may be used for detection and tracking of objects, for example, to avoid obstacles. In addition, such systems may be used in vehicles to alert a driver or user and/or to take evasive action, and are also useful in autonomously operated vehicles. Sensors mounted on vehicles or other systems are typically protected with covers (e.g., lens covers) to protect the sensors from environmental conditions. Such covers may periodically be cleaned to remove dirt and debris that could interfere with the receiving and transmission of signals.

SUMMARY

In one exemplary embodiment, an apparatus for protecting a sensor device includes a cover mounted on the sensor device, the cover including a cover portion made from a transparent material that is transparent to sensor signals, the cover portion including an external surface having a wettability that varies according to a wettability gradient in a selected direction along the surface.

In addition to one or more of the features described herein, the selected direction extends from a selected point on the surface to an edge of the surface, the wettability decreasing along the selected direction from a maximum value at the selected point to a minimum value at the edge.

In addition to one or more of the features described herein, the surface is circular, the selected point is a center point of the surface, and the selected direction is a radial direction.

In addition to one or more of the features described herein, the wettability is defined by a contact angle, and the gradient is a contact angle gradient selected from at least one of a static contact angle gradient, an advancing contact angle gradient and a receding contact angle gradient.

In addition to one or more of the features described herein, the contact angle gradient is a static contact angle gradient of least three degrees/millimeter.

In addition to one or more of the features described herein, the surface has a maximum static contact angle at the selected point on the surface, the static contact angle decreasing from the maximum contact angle along the direction toward the edge of the portion according to the contact angle gradient.

In addition to one or more of the features described herein, the static contact angle gradient is at least three degrees/millimeter, and the maximum static contact angle is at least about 100 degrees.

In addition to one or more of the features described herein, the transparent material includes a base material and a concentration of a constituent material, the constituent material configured to alter the wettability of the base material, a concentration of the constituent material varying along the selected direction to impart the wettability gradient to the surface.

In addition to one or more of the features described herein, the sensor device is selected from at least one of an optical camera, a radar device and a lidar device.

In one exemplary embodiment, a sensor device configured to be mounted at a vehicle includes a sensor to monitor an environment external to the vehicle, and a cover mounted on the sensor device. The cover includes a cover portion made from a transparent material that is transparent to sensor signals, the cover portion including an external surface having a wettability that varies according to a wettability gradient in a selected direction along the surface.

In addition to one or more of the features described herein, the selected direction extends from a selected point on the surface to an edge of the surface, the wettability decreasing along the selected direction from a maximum value at the selected point to a minimum value at the edge.

In addition to one or more of the features described herein, the surface is circular, the selected point is a center point of the surface, and the selected direction is a radial direction.

In addition to one or more of the features described herein, the wettability is defined by a contact angle, and the gradient is a contact angle gradient selected from at least one of a static contact angle gradient, an advancing contact angle gradient and a receding contact angle gradient.

In addition to one or more of the features described herein, the surface has a maximum static contact angle at the selected point on the surface, the static contact angle decreasing from the maximum contact angle along the direction toward the edge of the portion according to the contact angle gradient.

In addition to one or more of the features described herein, the transparent material includes a base material and a concentration of a constituent material, the constituent material configured to alter the wettability of the base material, a concentration of the constituent material varying along the selected direction to impart the wettability gradient to the surface.

In one exemplary embodiment, a method of manufacturing an apparatus for protecting a sensor device includes providing a transparent material that is transparent to sensor signals, and constructing a cover to be mounted on the sensor device. Constructing the cover includes imparting a wettability gradient to a portion of the cover including an external surface, the wettability gradient causing a wettability of the surface to vary in a selected direction extending along the surface.

In addition to one or more of the features described herein, the selected direction extends from a selected point on the surface to an edge of the surface, the wettability decreasing along the selected direction from a maximum value at the selected point to a minimum value at the edge.

In addition to one or more of the features described herein, constructing the cover includes forming a body with the transparent material, the portion of the cover being a component separate from the body, imparting the wettability gradient to the component, and attaching the component to the body.

In addition to one or more of the features described herein, imparting the wettability gradient includes varying a concentration of a constituent of the transparent material.

In addition to one or more of the features described herein, constructing the cover includes forming the portion of the cover with the transparent material and curing the transparent material after forming according to a curing temperature, wherein curing the material includes applying a curing temperature that varies along the selected direction.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 7A-7D depict the protective cover portion of FIG. 6 and illustrate behavior of a liquid applied to the surface of the protective cover portion;

DETAILED DESCRIPTION

Figure 1:
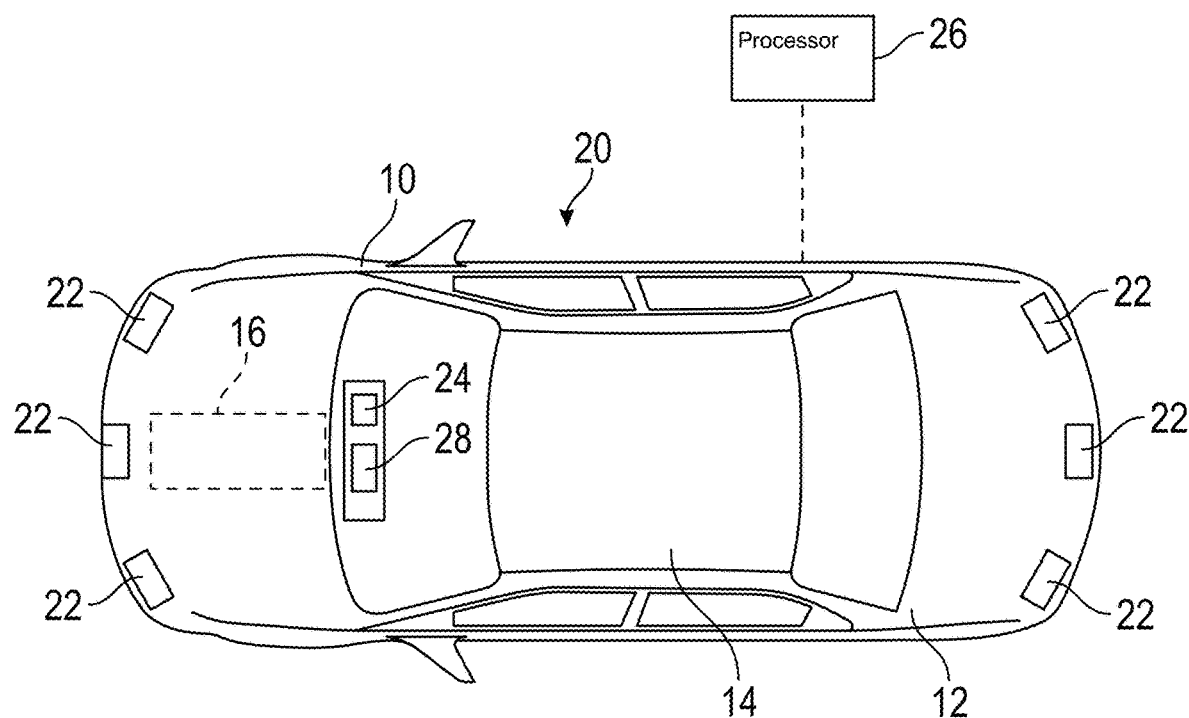
FIG. 1 is a top view of a motor vehicle including a sensor system including one or more sensor assemblies.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, devices and systems for protecting sensor devices are described herein. A sensor device may be a camera, radar and/or lidar sensing assembly for a vehicle, or for any other suitable application. A "sensor device" may encompass any device that transmits and/or receives signals and is not limited to specific examples described herein.

A protective component, such as a sensor cover, is configured to protect a sensor device from debris, dirt, water and/or other external conditions. The cover, or at least a portion of the cover (e.g., a region of the cover corresponding to the sensor's field of view), is transparent to sensor signals. Sensor signals may include signals emitted and/or signals received by the sensor. In an embodiment, a "transparent" component or portion refers to a component or portion that is able to transmit sensor signals therethrough to a degree sufficient to allow the sensor device to operate as intended.

The sensor cover includes a surface that has a variable wettability characteristic, such as contact angle, that varies as a function of distance from a selected point on the surface. For example, the surface has a contact angle that is highest at the selected point (e.g., a center of the surface) and decreases as a function of distance along one or more selected directions from the selected point (e.g., a radial direction). In an example, the cover is a circular cover (e.g., a flat or convex circular cover) and has a selected maximum contact angle at the surface. The contact angle decreases from the maximum along a radial direction from the cover's center toward an edge based on a wettability or contact angle gradient. The surface can be considered a self-propelling surface, in that the gradient causes liquid droplets to move along the surface with a higher speed and/or acceleration than such droplets would otherwise travel.

Embodiments described herein have numerous advantages. For example, the embodiments provide an effective way to facilitate cleaning of sensor device covers, as well as keeping the covers clean during use, without compromising performance. For example, the wettability characteristics of embodiments of the cover makes cleaning more efficient and effective.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

The vehicle 10 includes various sensors and sensor systems to facilitate vehicle operation, such as autonomous operation, semi-autonomous operation, driving assistance, parking assistance, monitoring and alerting. For example, the vehicle 10 includes one or more optical camera assemblies 20 configured to take images, such as color (RGB) images. Images may be still images or video images.

Additional devices or sensors may be included. For example, one or more radar assemblies 22 may be included in the vehicle 10. Although embodiments are described herein in conjunction with optical cameras, they may be utilized with other types of sensors, such as infrared, radar and lidar sensors.

The cameras 20 and/or radar assemblies 22 communicate with one or more processing devices, such as an on-board processing device 24 and/or a remote processor 26. The vehicle 10 may also include a user interface system 28 for allowing a user (e.g., a driver or passenger) to input data, view information, and otherwise interact with various vehicle subsystems.

Figure 2A:
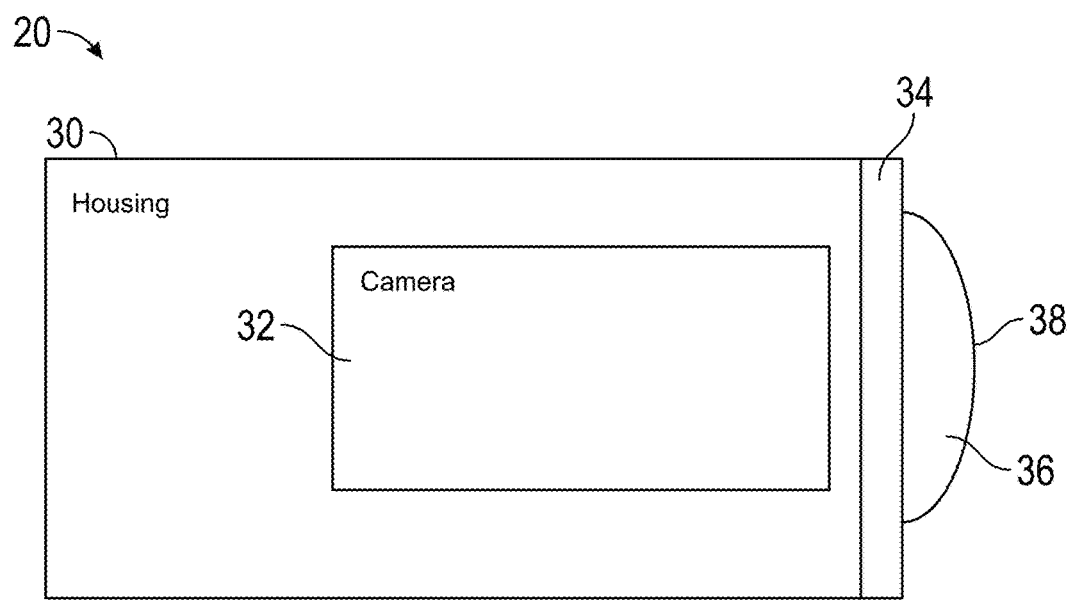
FIGS. 2A and 2B depict an example of a sensor assembly, and an embodiment of a protective cover.
Figure 2B:
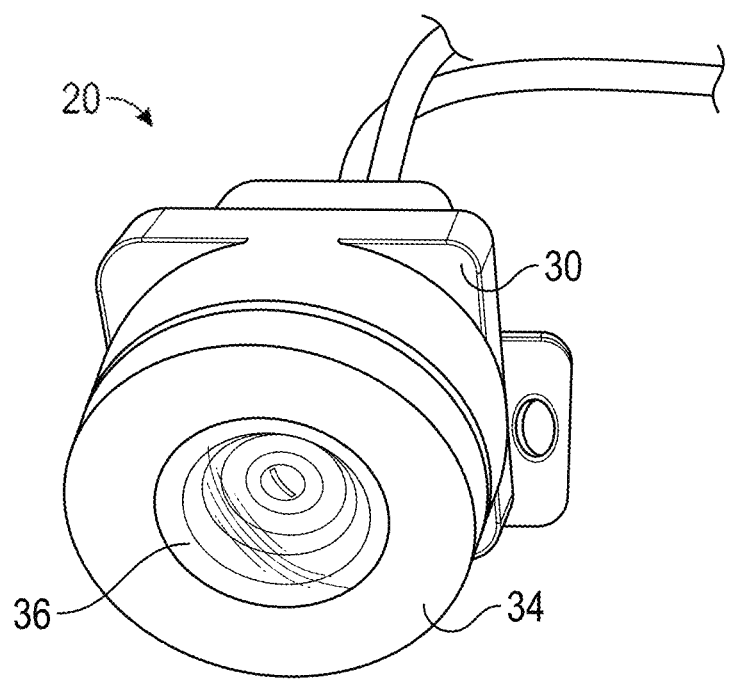

FIGS. 2A and 2B illustrate an example of a camera assembly 20. FIG. 2A is a cross-sectional view and FIG. 2B is a perspective view of the camera assembly 20. In this example, the camera assembly 20 includes a housing 30 configured to be mounted at a desired location on or in the vehicle 10 (e.g., front grill area, side area, rear, etc.). The housing 30 at least partially encloses a camera 32, and includes a protective cover 34. At least a portion of the protective cover 34 is made from a transparent material (i.e., transparent to visible light), such as a transparent polymer or glass. For example, the transparent portion of the protective cover 34 is a transparent lens protector 36.

A surface 38 of the lens protector 36 has wettability characteristics configured to propel water and/or other liquids or fluids along the surface 38. The surface 38 is self-propelling, in that the wettability characteristics cause droplets to accelerate along the surface 38 without external forces. In other words, droplets move with higher speeds and acceleration than they otherwise would in the absence of the wettability characteristics described herein.

In an embodiment, the wettability is quantified by contact angle. "Contact angle" refers to an angle between a surface of a liquid (e.g., a water or other liquid droplet) and the surface 38. The contact angle ranges between zero degrees and 180 degrees, where a smaller angle corresponds to higher wettability. The contact angle may be a static contact angle, an advancing contact angle and/or a receding contact angle.

In an embodiment, the wettability characteristic is a wettability gradient, which is a change in the wettability as a function of distance from a reference point along a selected direction. The wettability gradient may be a contact angle gradient.

The selected direction is a direction or path on a surface such as the surface 38. For example, the selected direction is a radial direction along the surface 38, which extends from a center point on the surface of the transparent lens protector 36 to an edge of the surface. However, the reference point is not limited to a center point, and the selected direction may be any suitable direction along the surface 38.

It is noted that the wettability characteristic (e.g., contact angle) may change continuously according to the gradient, or change in an incremental or step-wise manner. For example, the gradient may be established by changing the wettability along the selected direction by increments or layers. The increments may be of constant width or distance or variable width or distance.

Figure 3:
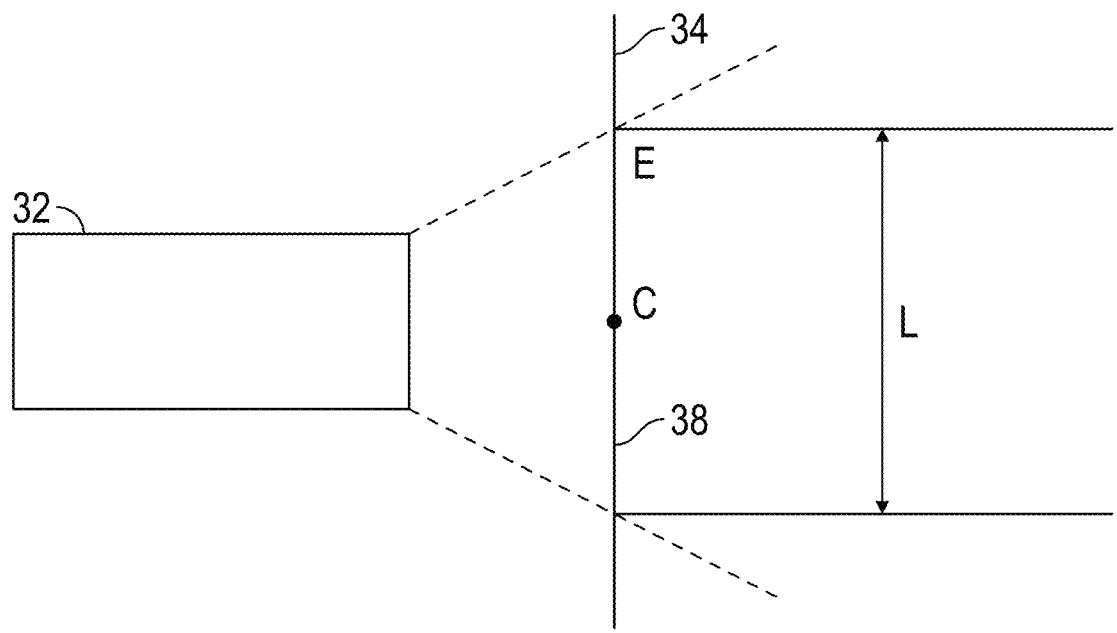
FIG. 3 depicts an embodiment of a surface of a protective cover for a sensor device or assembly.

FIG. 3 schematically illustrates another example of the surface 38. In this example, the surface 38 is a flat circular surface that is transparent to visible light (or other signals if a different sensor is used). The area of the surface 38 is defined by a distance L selected so that the surface 38 corresponds to a field of view of the camera 32.

The surface 38 has a wettability gradient in one or more selected directions. In an embodiment, the wettability gradient is applied in a direction along the surface 38 that extends from a center C of the surface 38 to an edge E of the surface 38. If the surface 38 is circular, the direction may be a radial direction.

The wettability gradient can be achieved along different axes or directions to achieve a desired fluid behavior on the surface 38. For example, the direction can be selected based on orientation of a sensor device relative to gravity when installed (e.g., the direction may be in a vertical direction or the direction of gravity along the surface 38). In other examples, the surface 38 may have a wettability gradient along a circular path on the surface 38.

Figure 4:
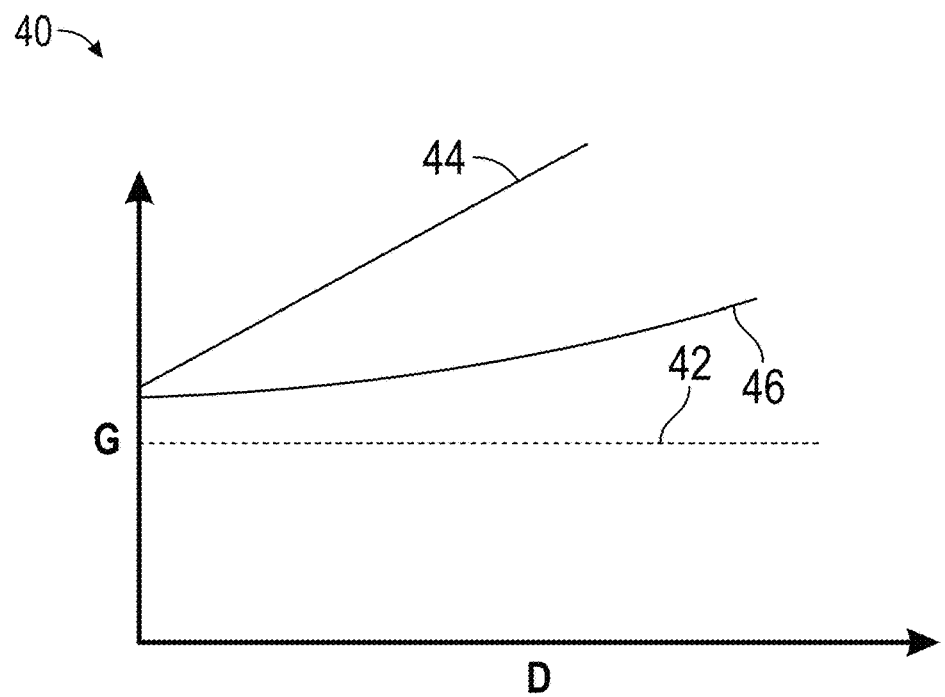
FIG. 4 is a graph depicting embodiments of a wettability gradient of at least a portion of a protective cover for a sensor device or assembly.

FIG. 4 is a graph 40 that depicts examples of the wettability gradient G as a function of distance D from the center C of the surface 38. The gradient G may be constant along the direction, as shown by curve 42 (e.g., a constant gradient of about three degrees/millimeter (deg/mm) or more). The gradient G may also be variable (i.e., the gradient itself changes as a function of distance). For example, curve 44 represents a gradient that increases linearly as the distance D from the center C increases, and curve 46 represents a non-linear gradient example.

In an embodiment, the surface 38 can include multiple sections or regions of the surface 38 that have different gradients. For example, as discussed further herein, the surface 38 may include an inner region (e.g., a center region defined by a radius that is smaller than the radius of the surface 38) that has a first gradient, and an outer region surrounding the inner region that has a second, different gradient. For example, the inner region can have a smaller gradient, and the outer region can have a larger gradient.

In an embodiment, the gradient (e.g., a contact angle gradient) decreases from a maximum contact angle value (e.g., 100 degrees or more) at a selected point on a surface such as the surface 38 (e.g., a center point). The gradient is a negative gradient, in that the contact angle decreases according to the gradient with distance from the selected point or center point.

The wettability gradient and maximum wettability may have any suitable values. An example of a wettability gradient is a contact angle gradient of at least about three deg/mm. An example of a maximum wettability is a maximum contact angle of at least about 100 degrees.

It is noted that the variable wettability characteristics can be applied only to a transparent portion of a cover, or can be applied to other portions of the cover. For example, in addition to the lens protector 36 having a wettability gradient, other surfaces of the protective cover 34 can be treated or otherwise configured to have wettability characteristics describe herein.

Figure 5:
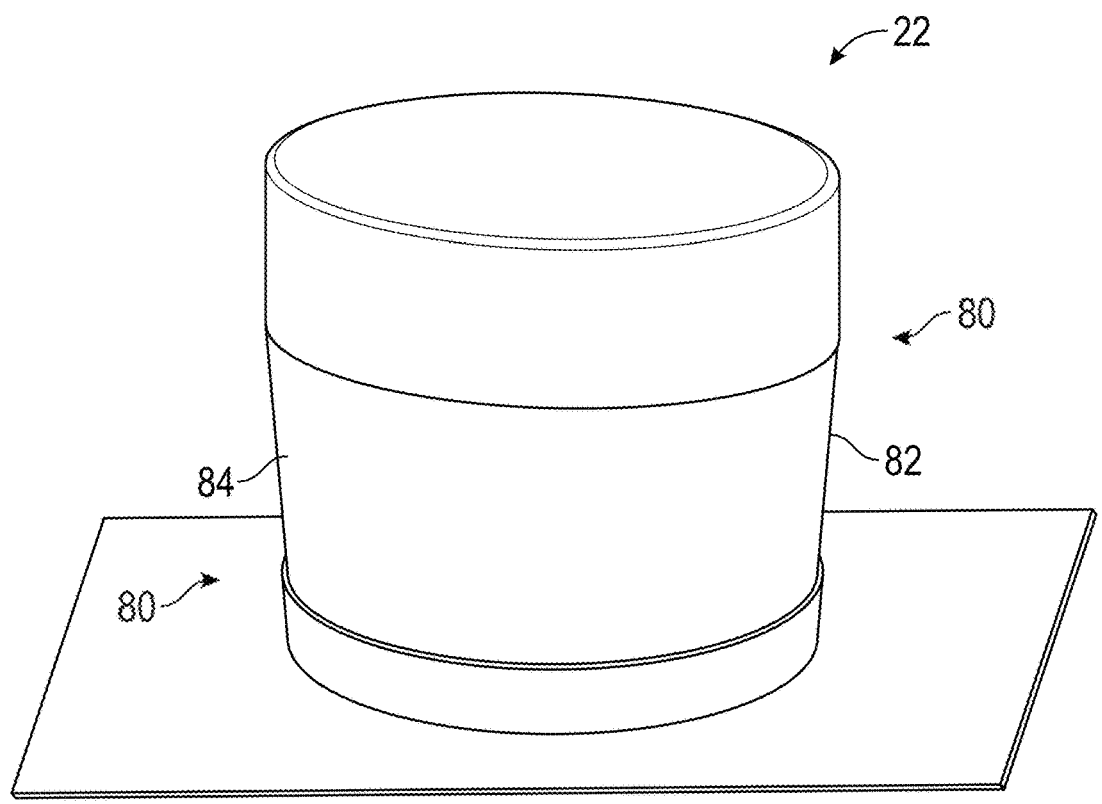
FIG. 5 depicts an example of a sensor assembly, and an embodiment of a protective cover.

FIG. 5 depicts an example of the radar assembly 22 and an example of a protective cover having a wettability gradient. In this example, the radar assembly 22 is a lidar assembly that includes a housing 80 configured to be mounted at a desired location on or in the vehicle 10. The housing 80 includes a protective cover 82 in the form of a cylindrical window. An outer surface 84 of the cover 82 has wettability characteristics and/or a wettability gradient as described herein.

Contact angle may be measured as a static contact angle, or a dynamic contact angle measured for a moving droplet. For example, the contact angle may be measured as an advancing contact angle and/or receding contact angle. The difference between the advancing and receding contact angle is referred to as "contact angle hysteresis." As the advancing and receding contact angles may be related to chemical composition, the advancing and receding contact angles (and/or contact angle hysteresis) can be controlled by modifying or controlling material properties as discussed herein.

Figure 6:
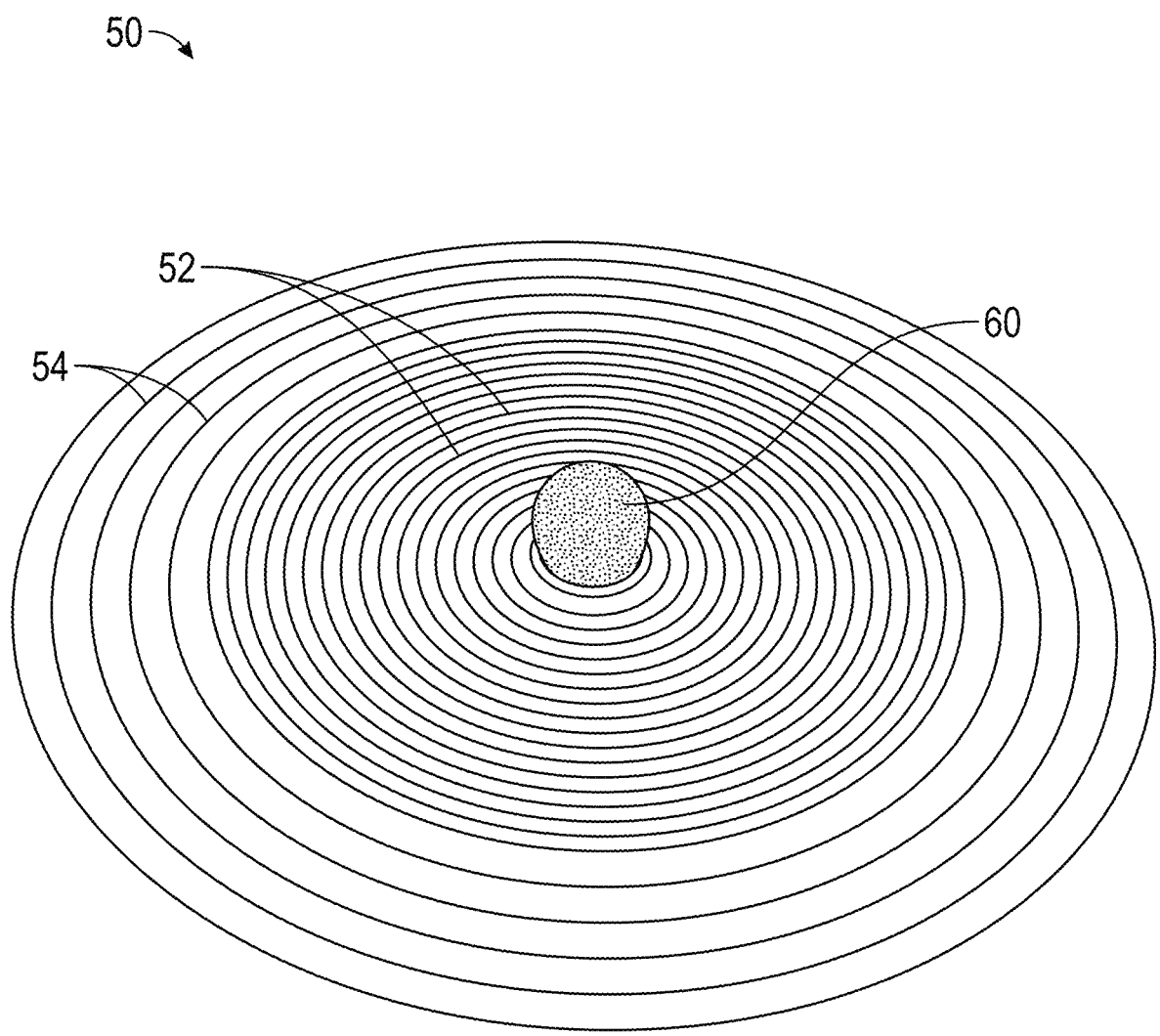
FIG. 6 depicts an example of a portion of a protective cover having a surface with a wettability gradient.

FIG. 6 is an example of a surface 50 (which may be integral with a cover or cover portion, or a separate component attached thereto). The surface 50 may be the surface 38 of the lens protector 36 (FIG. 2A), the outer surface 84 of the cover 82 (FIG. 5), or any other surface. In this example, the wettability corresponds to static contact angle, which is decreased incrementally as a function of distance from the center, according to a selected contact angle gradient. The contact angle is decreased step-wise in successive radial increments. In this example, the surface includes an inner region having relatively short increments 52, and an outer region having relatively long increments 54. The short increments 52 each have a radial width $dr_{inner}$ of about 0.5 mm ($dr_{inner}$=0.5 mm), and the long increments 54 each have a radial width $dr_{outer}$ of about one mm ($dr_{outer}$=1 mm). It is noted that the increment widths and configurations, as well as wettability values and gradients, are not limited to any specific value or example discussed herein. The contact angle decreases between successive increments 52 of the inner region according to a first selected contact angle gradient (e.g., 1.5 deg/mm), and the contact angle decreases between successive increments 54 of the outer region according to a second selected contact angle gradient. The second selected contact angle gradient may be the same as the first contact angle gradient of the inner region (e.g., 1.5 deg/mm), or different than the first contact angle gradient (e.g., 3 deg/mm).

FIGS. 7A-7D depict an example of liquid movement over time along the surface 50 due to factors that include the surface shape and profile (e.g., circular and convex) and the wettability/contact angle gradient. The liquid was applied as an initial drop 60 of liquid at the center of the surface 50 (see FIG. 6). Specifically, FIG. 7A depicts movement of the liquid at a first time (0.013 seconds from a time when the liquid was dropped on the surface), FIG. 7B depicts the liquid at a second time (0.038 seconds), FIG. 7C depicts the liquid at a third time (0.054 seconds) and FIG. 7D depicts the liquid at a fourth time (0.079 seconds). As shown, as the liquid traverses the surface, it separates into droplets 62 of various sizes.

Figure 8D:
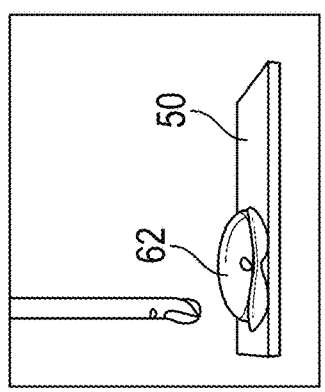
FIGS. 8A-8D depict changes in contact angle of a droplet of the liquid of FIGS. 7A-7D.
Figure 8C:
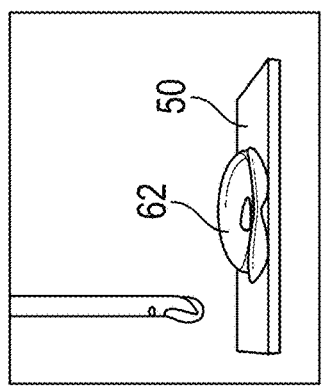
Figure 8B:
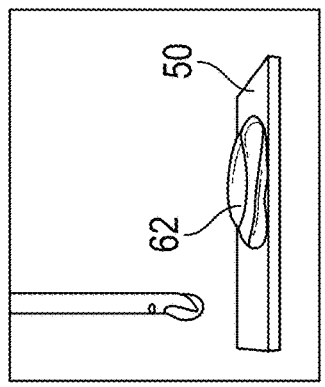
Figure 8A:
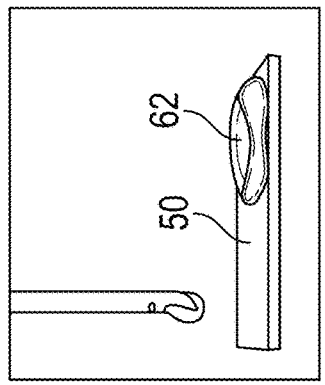

FIGS. 8A-8D depict a water droplet 62 of the liquid at the times indicated in FIGS. 7A-7D. FIG. 8A shows the droplet 62 at the first time (0.013 seconds), FIG. 8B shows the droplet 62 at the second time (0.038 seconds), FIG. 8C shows the droplet 62 at the third time (0.054 seconds) and FIG. 8D shows the droplet 62 at the fourth time (0.079 seconds).

As shown, the water droplet 62 has a higher contact angle when it is at or near the center, and spreads with successively smaller contact angles as the droplet 62 travels toward the edge of the surface 50.

In the above example, the drop 60 of liquid has an initial diameter ($D_{droplet}$) of about 3.17 mm at the center of the surface 50. The advancing contact angle $\theta_{adv\_inner}$ of droplets 62 when at the inner region (with increments 52) is about 105 degrees, and the receding contact angle $\theta_{rec\_inner}$ at the inner region is about 95 degrees. The contact angle gradient at the inner region ($\Delta\theta_{inner}$) is about 1.5 degrees, and the contact angle gradient at the inner region ($\Delta\theta_{outer}$) is about three degrees.

The following are additional examples of wettability characteristics of the surface 50 and fluid behavior. In each of these examples, $dr_{inner}$ is about 0.5 mm and $dr_{outer}$ is about one mm. The initial drop 60 of liquid diameter $D_{droplet}$ is about 3.17 mm.

In a first additional example, $\Delta\theta_{inner}$ is about one degree, and $\Delta\theta_{outer}$ is about two degrees. $\theta_{adv\_inner}$ is about 105 degrees, and the $\theta_{rec\_inner}$ is about 95 degrees. In a second additional example, $\Delta\theta_{inner}$ is about 1.5 degrees, and $\Delta\theta_{outer}$ is about three degrees. $\theta_{adv\_inner}$ is about 105 degrees, and $\theta_{rec\_inner}$ is about 100 degrees. In a third additional example, $\Delta\theta_{inner}$ is about one degree, and $\Delta\theta_{outer}$ is about two degrees. $\theta_{adv\_inner}$ is about 120 degrees, and $\theta_{rec\_inner}$ is about 115 degrees.

Figure 9:
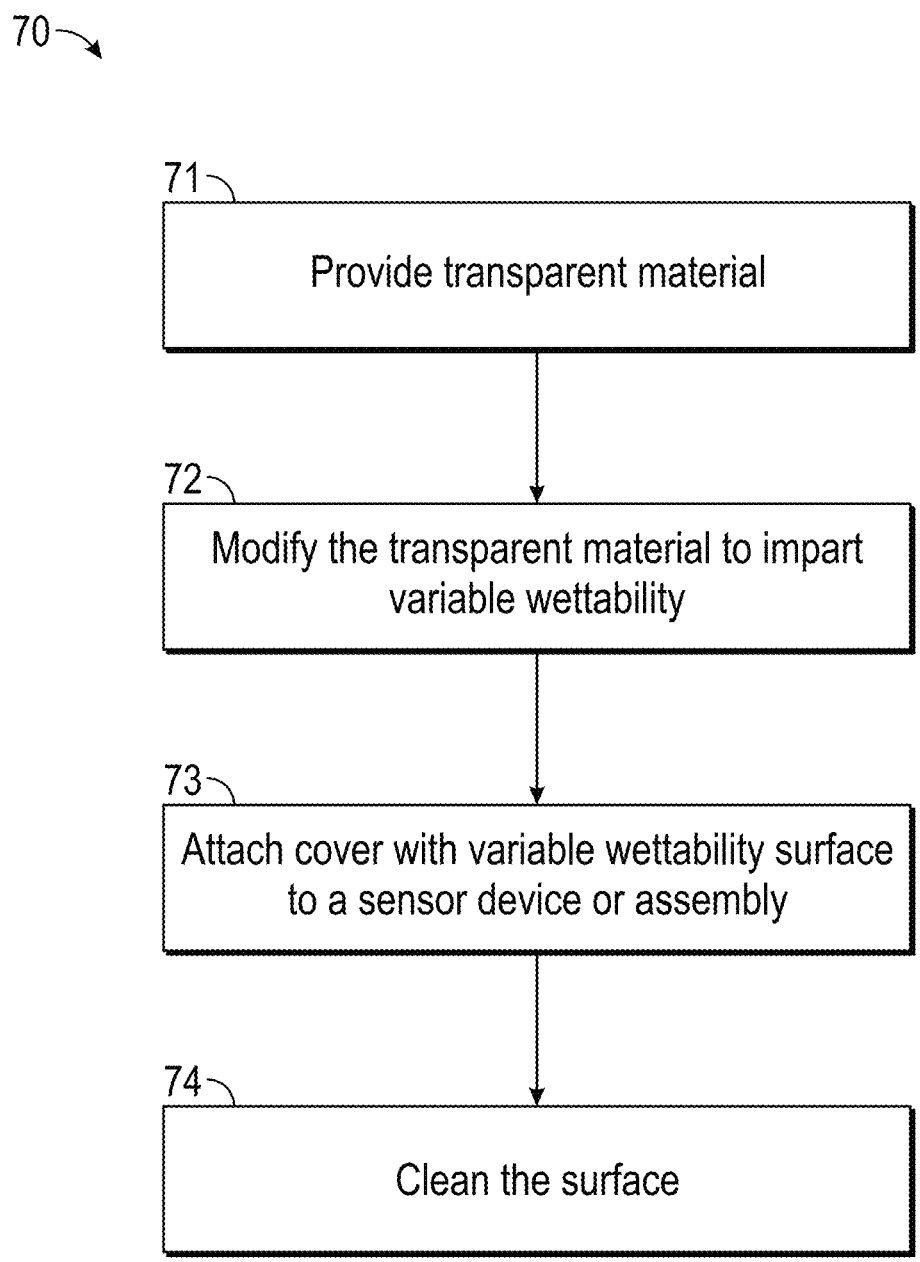
FIG. 9 is a flowchart depicting a method of manufacturing a cover and/or cover portion for a sensor device or assembly.

FIG. 9 illustrates an embodiment of a method 70 of manufacturing a protective apparatus or device. Aspects of the method 70 may be performed by a processor or processors, exclusively or in combination with a human operator or operators. For example, the method 70 may be performed in conjunction with a fabrication system for fabricating various components and/or a cleaning system.

The method 70 includes a number of steps or stages represented by blocks 71-74. The method 70 is not limited to the number or order of steps therein, as some steps represented by blocks 71-74 may be performed in a different order than that described below, or fewer than all of the steps may be performed.

At block 71, a transparent material is provided, which is transparent to sensor signals. For example, a lens cover made from a polymer or glass material for a camera assembly is provided. If the wettability characteristic is desired to be applied to a separate component, the separate component may be provided. Examples of materials that can be used to form the cover and/or component include polymers, such as poly(methyl methacrylate) (PMMA), polydimethylsiloxane (PDMS) and polytetrafluoroethylene (PTFE), and composites thereof.

At block 72, the cover or component is treated or otherwise modified to create the variable wettability characteristic (e.g., contact angle gradient or gradients). The wettability characteristic can be applied by varying material properties. For example, the cover material can be processed by varying the relative concentrations of hydrophobic and hydrophilic constituent components.

In an embodiment, the material used for the cover and/or component includes a base material, such as glass or polymer material, and includes one or more additional materials that can affect the contact angle. The concentration of such additional materials may be varied to create the gradient. For example, a PMMA polymer may be used to form the cover, and a concentration of silicon dioxide and/or titanium oxide is varied according to a selected contact angle gradient. The concentration may be varied by providing successive layers or rings (e.g., via additive manufacturing or other processes) that have successively smaller concentrations of silicon dioxide or other additional material.

Other methods include changing the curing temperature of the cover material. Different materials may have different responses to changes in curing temperature. For example, for PDMS, the contact angle increases with increases in curing temperature. A gradient can be imparted, for example, by curing portions of the cover material with successively increasing or decreasing curing temperatures.

If the surface is part of a separate component, the separate component is attached in any suitable manner, such as by adhesion. For example, the separate component can be a transparent film or layer that is attached to the cover by an adhesive.

At block 73, the cover is attached to a sensor device and/or sensor housing to construct a sensor device, such as a camera assembly 20 or radar assembly 22. The sensor device may then be mounted on a vehicle or used as desired.

At block 74, at some time after use, the cover is cleaned according to any suitable cleaning method. Examples of cleaning methods include ultrasonic cleanings, rotation cleaning and stationary surface cleaning. It is noted that cleaning can occur at any time. For example, the cover can be cleaned during the manufacturing process, prior to attaching the cover, or any time after the sensor device is in use.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus configured to protect a sensor device, the apparatus comprising:
    a cover mounted on the sensor device, the cover including a cover portion made from a transparent material that is transparent to sensor signals, the cover portion including an external surface having a wettability that varies according to a wettability gradient in a selected direction along the surface.

2. The apparatus of claim 1, wherein the selected direction extends from a selected point on the surface to an edge of the surface, the wettability decreasing along the selected direction from a maximum value at the selected point to a minimum value at the edge.

3. The apparatus of claim 2, wherein the surface is circular, the selected point is a center point of the surface, and the selected direction is a radial direction.

4. The apparatus of claim 2, wherein the wettability is defined by a contact angle, and the gradient is a contact angle gradient selected from at least one of a static contact angle gradient, an advancing contact angle gradient and a receding contact angle gradient.

5. The apparatus of claim 4, wherein the contact angle gradient is a static contact angle gradient of least three degrees/millimeter.

6. The apparatus of claim 4, wherein the surface has a maximum static contact angle at the selected point on the surface, the static contact angle decreasing from the maximum contact angle along the direction toward the edge of the portion according to the contact angle gradient.

7. The apparatus of claim 6, wherein the static contact angle gradient is at least three degrees/millimeter, and the maximum static contact angle is at least 100 degrees.

8. The apparatus of claim 1, wherein the transparent material includes a base material and a concentration of a constituent material, the constituent material configured to alter the wettability of the base material, a concentration of the constituent material varying along the selected direction to impart the wettability gradient to the surface.

9. The apparatus of claim 1, wherein the sensor device is selected from at least one of an optical camera, a radar device and a lidar device.

10. A sensor device configured to be mounted at a vehicle, the sensor device including:
a sensor to monitor an environment external to the vehicle; and
a cover including a cover portion made from a transparent material that is transparent to sensor signals, the cover portion including an external surface having a wettability that varies according to a wettability gradient in a selected direction along the surface.

11. The device of claim 10, wherein the selected direction extends from a selected point on the surface to an edge of the surface, the wettability decreasing along the selected direction from a maximum value at the selected point to a minimum value at the edge.

12. The device of claim 11, wherein the surface is circular, the selected point is a center point of the surface, and the selected direction is a radial direction.

13. The device of claim 11, wherein the wettability is defined by a contact angle, and the gradient is a contact angle gradient selected from at least one of a static contact angle gradient, an advancing contact angle gradient and a receding contact angle gradient.

14. The device of claim 13, wherein the surface has a maximum static contact angle at the selected point on the surface, the static contact angle decreasing from the maximum contact angle along the direction toward the edge of the portion according to the contact angle gradient.

15. The device of claim 10, wherein the transparent material includes a base material and a concentration of a constituent material, the constituent material configured to alter the wettability of the base material, a concentration of the constituent material varying along the selected direction to impart the wettability gradient to the surface.

16. A method of manufacturing an apparatus configured to protect a sensor device, the method comprising:
providing a transparent material that is transparent to sensor signals; and
constructing a cover to be mounted on the sensor device, wherein constructing the cover includes imparting a wettability gradient to a portion of the cover including an external surface, the wettability gradient causing a wettability of the surface to vary in a selected direction extending along the surface.

17. The method of claim 16, wherein the selected direction extends from a selected point on the surface to an edge of the surface, the wettability decreasing along the selected direction from a maximum value at the selected point to a minimum value at the edge.

18. The method of claim 16, wherein constructing the cover includes forming a body with the transparent material, the portion of the cover being a component separate from the body, imparting the wettability gradient to the component, and attaching the component to the body.

19. The method of claim 16, wherein imparting the wettability gradient includes varying a concentration of a constituent of the transparent material.

20. The method of claim 16, wherein constructing the cover includes forming the portion of the cover with the transparent material and curing the transparent material after forming according to a curing temperature, wherein curing the material includes applying a curing temperature that varies along the selected direction.

* * * * *